[heading omitted]

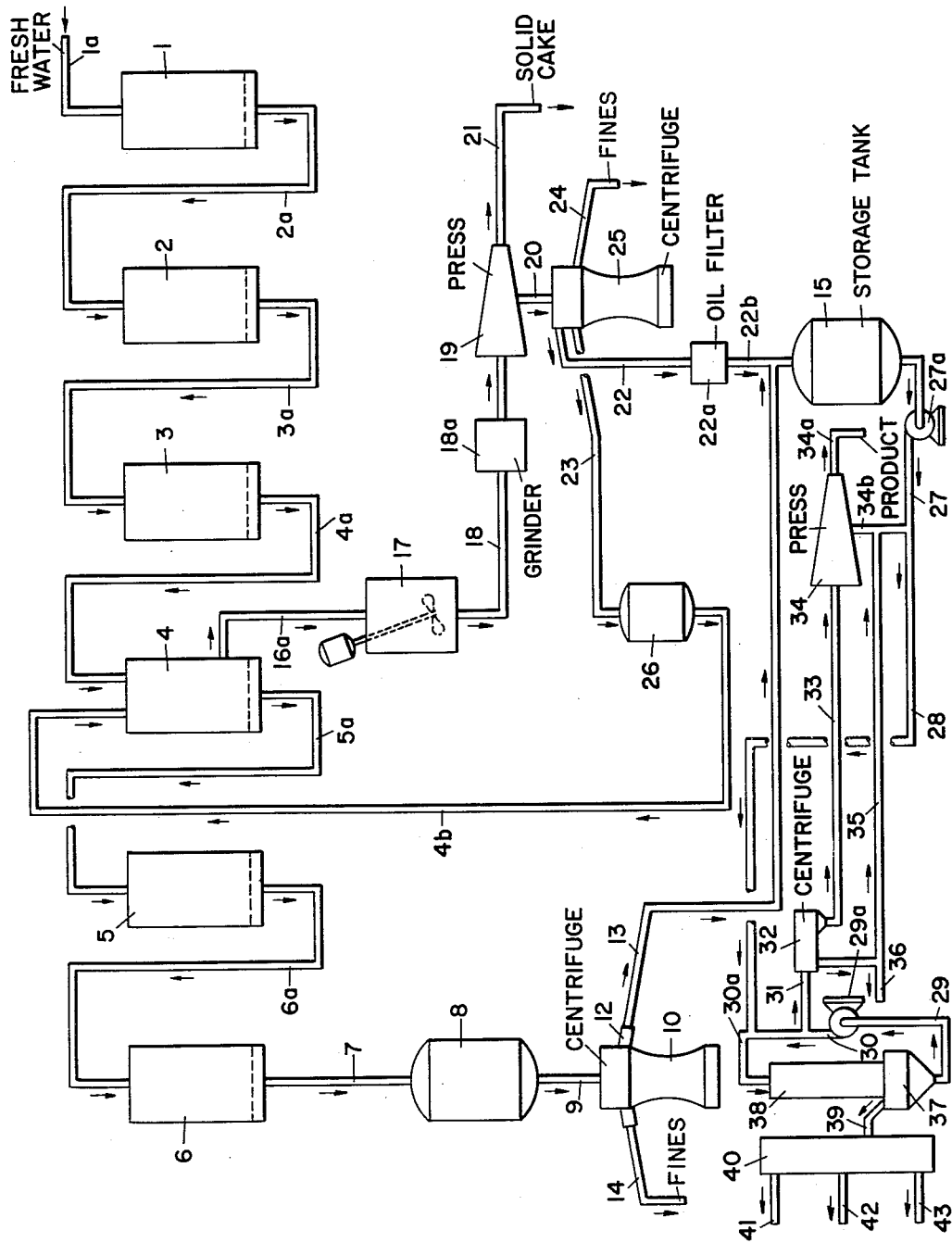

3,035,921
MANUFACTURE OF SOLUBLE COFFEE
Robert W. Carver, Fairmount Ave., Chatham, N.J., and Charles Greenfield, 3 Templeton Arms, N. Broad St., Elizabeth, N.J.
Filed May 6, 1959, Ser. No. 811,426
3 Claims. (Cl. 99—71)

This invention relates to an improved process for the preparation of soluble coffee. More particularly it relates to a process of this nature in which coffee oil separated in the process is re-utilized to facilitate the obtaining of a superior product.

Soluble coffee has achieved increased consumer acceptance during the past decade. Conventionally soluble coffee product is obtained by countercurrent staged extraction of ground roasted coffee with water. The water extractant flow is inverse to the temperature staging, i.e., the water extractant flows from the stage of higher temperature to lowest temperature. The soluble coffee extract in water is then conventionally clarified, sometimes concentrated to some extent as by evaporation, and finally spray dried. Securing adequate body and "fresh-roasted flavor" in soluble coffee has represented one of the problems in the process. These difficulties are aggravated by conventional evaporation or by spray drying because of loss of aromatics.

This invention provides an improved method for overcoming these difficulties. The method comprises in the countercurrent extraction of ground, roasted coffee, pressing a portion of the preferably at least partially spent ground coffee at a minimum pressure of about 1000 p.s.i. to separate therefrom a liquid phase of soluble coffee, coffee oil and fines. A portion of the coffee oil can be returned to the ground coffee being further extracted. Additionally, the process of this invention provides for dehydrating the soluble coffee extract phase at subatmospheric pressure and low temperatures to recover a dehydrated soluble coffee product. This dehydration-evaporation is carried out in the presence of added oil, particularly coffee oil separated in the process. The aromatic components from the dehydration operation can be recovered and either combined with the dehydrated coffee product or recycled to the soluble coffee extract phase.

The roasted coffee feed is first ground in the conventional manner.

The temperature used for the subsequent aqueous extraction is in the range of about 100° to 300° F., preferably about 120° to 200° F. As stated previously, countercurrent contacting is employed. Overall, about 1 to 2 parts water are used per part of roasted ground bean.

A portion of the spent ground coffee is pressed at a minimum pressure of 1,000 p.s.i. to separate a liquid phase of soluble coffee, coffee oil and fines. About 15 to 100 weight percent of the spent ground coffee is so pressed, preferably about 20% to 40%. It is to be understood that the term "spent ground coffee" connotes coffee which has been extracted to any extent and thus conveniently the coffee for pressing is taken from any stage of water contact.

A portion of the coffee oil after separation of fines therefrom may be recycled to the ground coffee being extracted to improve its aromatic characteristics.

The soluble coffee extract phase after separation of fines therefrom is dehydrated at a temperature in the range of about 80° to 150° F. and at a subatmospheric pressure, e.g., about 5 to 75 mm. absolute.

This dehydration is carried out in the presence of additional oil which preferably is coffee oil separated in the process. Other edible oils such as corn, cotton seed, or peanut can be used.

This invention will be better understood by reference to the following description, example and the flow diagram.

Fresh water at a temperature of 200° to 250° F., e.g. 225° F. is pumped through line 1a into the continuous extractor train shown as percolators numbers 1 through 6. Any convenient multi-stage extraction can be used. It is to be noted that the extraction train is interrupted at No. 4 extractor where a portion of the extracted coffee grounds 16a are removed along with a portion of the extract. The temperature is lowered as the solution is pumped through the train. At extractor No. 4 approximately 20–40% of the coffee grounds and extract are delivered to hold tank 17 where the mixture as a slurry flows through line 18 and is more finely ground in grinder 18a.

The slurry is then fed through a high pressure press 19 at a temperature in the range of 100° to 175° F., e.g., 135° F., and a cake is discharged through 21 which can be utilized for its fuel value. The liquid flowing through line 20 consists of coffee extract and coffee oils. This liquid mixture is separated in centrifuge 25 into an oil stream 22 and soluble extract stream 23. The oil phase is then filtered through polish filter 22a and passes to storage tank 15 by means of line 22b.

The extract stream 23 is stored in surge tank 26. This liquid extract is returned to extractor 4, through line 4b, at the proper time when the train is in operation for additional extraction of soluble coffee through stages 4, 5 and 6. In this fashion the normal operation of the extraction train is maintained except a portion of coffee grounds are removed intermittently during the 4th extraction step. Added oil at the pressing stage can be utilized such as coffee or a vegetable oil to more efficiently extract the coffee oil component.

The coffee extract leaves at the lowest temperature in the system generally 100° to 125° F. through line 7 and holding tank 8 where it discharges continuously through line 9 into continuous centrifuge 10, where clarified soluble extract is delivered from exit spout 12 of the centrifuge to line 13 where it joins 22b or clarified coffee oil line and flows into storage tank 15.

From storage tank 15 pump 27a delivers a controlled quantity of coffee oil and coffee concentrate mixture to a low temperature falling film ammonia recompression evaporator or other low temperature evaporator 38 and the drying process is carried out as described in Serial No. 617,987, where drying is carried out in an oil medium using a high solids concentration in the evaporator to avoid gelatinous and gummy stages. The feed is at 29 ahead of suction of pump 29a and the pump discharges through lines 30 and 30a as recirculation to the evaporator. Coffee solids in oil is discharged through line 31 and this dry slurry consisting of soluble coffee particles in coffee oil is passed through a horizontal bowl centrifuge 32, where a relatively thick sludge or cake is discharged to press 34. A hard cake of soluble coffee powder containing 3–10% oil is withdrawn through line 34a and can be ground as desired as product. The liquid fraction in line 35 contains the bulk of the oil which is returned to the evaporator. Oil from press 34 is recycled through 34b. Excess oil can be withdrawn from the process through line 36.

Vapors containing a portion of the aromatics are sent through line 39 to fractionating tower 40 where aromatic fractions are withdrawn through line 41. Water is withdrawn through line 42 and acidic components through line 43.

In the evaporator 38 a ratio of oil/solids of about 3–10/1 is maintained.

The dried coffee grounds can be treated with oil in countercurrent extraction procedure to extract coffee oil and aromatic constituents. Ground roasted coffee can be countercurrently extracted to achieve the same purpose.

Alternatively the coffee can be ground finely through a hammer mill, water added and the system heated to about 150°–200° F. Then the system is pressed and coffee oil, soluble coffee and fines are recovered. The fines are removed as by centrifuging and the residual material dried as taught.

The advantages of this invention will be apparent to those skilled in the art. Novel soluble coffees are prepared with good brew and fresh roasted characteristics. Thus a homogenized soluble coffee product containing 3–20 wt. percent coffee oil has particular utility. Acid components are eliminated making the coffee suitable for people subject to gastritis. The flexibility of the process permits of many variations in characteristics of the product by varying aromatics, coffee oil and acid components at will. The process can be operated continuously or batch.

Features of this invention can be adapted to other food and beverage products, e.g. fruits and juices, e.g. tomato, orange or pineapple juice, vegetables, spices, and flavors, which are equivalent to the coffee product.

The coffee oil can be obtained from the partially spent ground coffee by either direct expression or the partially spent grounds can be dried by the technique described in U.S. Patent No. 2,979,408 to obtain a dry powder in coffee oil mixture which can then be separated into coffee oil and "grounds" powder.

It is to be understood that this invention is not limited to the specific examples which have been offered merely as illustrations and that modifications may be made without departing from the spirit of the invention.

What is claimed is:

1. In the countercurrent extraction of soluble coffee from ground roasted coffee with water in a plurality of stages of progressively higher temperature in the range of 100° to 300° F. to obtain a soluble coffee extract phase, the water extractant flow being inverse to the temperature staging, the improvement which comprises pressing at least a portion of the partially spent ground coffee at a minimum pressure of about 1000 p.s.i. to separate therefrom a liquid phase of soluble coffee, coffee oil and fines, separating fines from the soluble coffee extract phase containing coffee oil and dehydrating this extract phase in the presence of additional coffee oil recycled from the process, so as to give a ratio of oil/solids of about 3–10/1, at subatmospheric pressure and a temperature in the range of 80° to 150° F. to recover a dehydrated soluble coffee product.

2. The process of claim 1 in which the aromatic components recovered in the effluent from the dehydration step are combined with the dehydrated coffee product.

3. The process of claim 1 in which coffee oil is added to the partially spent ground coffee prior to pressing.

References Cited in the file of this patent

UNITED STATES PATENTS

| | | |
|---|---|---|
| 358,300 | Samelson | Feb. 22, 1887 |
| 1,292,458 | Hamor | Jan. 28, 1919 |
| 1,393,045 | Scott | Oct. 11, 1921 |
| 1,989,077 | Bredt | Jan. 29, 1935 |
| 2,340,989 | Salkin | Feb. 8, 1944 |
| 2,408,260 | Kellogg | Sept. 24, 1946 |

FOREIGN PATENTS

| | | |
|---|---|---|
| 246,454 | Great Britain | Oct. 14, 1926 |

OTHER REFERENCES

"Drying and Dehydration of Foods," Second Edition, 1955, by Von Loesecke, Reinhold Publishing Co. (New York), pp. 5 to 7 relied on.